United States Patent
Wang (10) Patent No.: US 11,117,513 B2
(45) Date of Patent: Sep. 14, 2021

(54) METHOD AND APPARATUS FOR VEHICLE INTERACTION FOR AUTONOMOUS VEHICLE

(71) Applicant: Beijing Baidu Netcom Science And Technology Co., LTD., Beijing (CN)

(72) Inventor: Ya Wang, Beijing (CN)

(73) Assignee: Beijing Baidu Netcom Science And Technology Co., Ltd., Beijing (CN)

( * ) Notice: Subject to any disclaimer, the term of this patent is extended or adjusted under 35 U.S.C. 154(b) by 0 days.

(21) Appl. No.: 16/691,081

(22) Filed: Nov. 21, 2019

(65) Prior Publication Data
US 2020/0276931 A1    Sep. 3, 2020

(30) Foreign Application Priority Data

Feb. 28, 2019    (CN) .......................... 201910151729.1

(51) Int. Cl.
- *B60Q 1/22*    (2006.01)
- *B60Q 1/50*    (2006.01)
- *B60W 30/18*    (2012.01)
- *B60W 40/04*    (2006.01)
- *B60W 30/095*    (2012.01)

(52) U.S. Cl.
CPC ........... *B60Q 1/50* (2013.01); *B60W 30/0956* (2013.01); *B60W 30/18154* (2013.01); *B60W 40/04* (2013.01); *B60W 2554/80* (2020.02); *B60W 2556/45* (2020.02)

(58) Field of Classification Search
CPC ................ B60Q 1/50; B60W 30/0956; B60W 30/18154; B60W 40/04; B60W 2556/45; B60W 2554/80

USPC ......................................................... 340/463
See application file for complete search history.

(56) References Cited

U.S. PATENT DOCUMENTS

| 5,633,629 A * | 5/1997 | Hochstein .............. G08G 1/095 |
| | | 340/907 |
| 6,940,422 B1 * | 9/2005 | Bachelder .............. G08G 1/087 |
| | | 340/906 |

(Continued)

FOREIGN PATENT DOCUMENTS

| CN | 104575045 A | 4/2015 |
| CN | 105321362 A | 2/2016 |

(Continued)

*Primary Examiner* — Kerri L McNally
*Assistant Examiner* — Thang D Tran
(74) *Attorney, Agent, or Firm* — Nixon Peabody LLP (57) ABSTRACT

Embodiments of the present disclosure provide a method and apparatus for vehicle interaction for an autonomous vehicle. The method may include: determining, in response to determining that a running route of the autonomous vehicle at a currently arriving intersection overlaps with a running route of an opposing vehicle at the currently arriving intersection, a party having a right of way at the currently arriving intersection from the autonomous vehicle and the opposing vehicle a based on the running route of the autonomous vehicle and the running route of the opposing vehicle; and generating and transmitting a prompt message based on a determining result of the right of way, the prompt message being used for prompting the party having the right of way to go first and a party having no right of way to give way.

15 Claims, 4 Drawing Sheets

(56) References Cited

U.S. PATENT DOCUMENTS

| | | | |
|---|---|---|---|
| 8,954,252 B1* | 2/2015 | Urmson | G08G 1/167 |
| | | | 701/70 |
| 9,459,623 B1* | 10/2016 | Raghu | G01S 13/931 |
| 9,934,685 B1* | 4/2018 | Bernhardt | G08G 1/005 |
| 10,118,548 B1* | 11/2018 | Fields | B60Q 5/005 |
| 10,229,592 B1* | 3/2019 | Elsheemy | G08G 1/096725 |
| 10,650,673 B1* | 5/2020 | Elsheemy | G08G 1/081 |
| 2002/0198632 A1* | 12/2002 | Breed | G08G 1/164 |
| | | | 701/1 |
| 2005/0012602 A1* | 1/2005 | Knoop | G01S 13/867 |
| | | | 340/435 |
| 2005/0060069 A1* | 3/2005 | Breed | B60N 2/2863 |
| | | | 701/408 |
| 2005/0083183 A1* | 4/2005 | Cao | B60Q 1/268 |
| | | | 340/426.13 |
| 2005/0104745 A1* | 5/2005 | Bachelder | G08G 1/07 |
| | | | 340/906 |
| 2007/0265767 A1* | 11/2007 | Yamamoto | G08G 1/162 |
| | | | 701/117 |
| 2008/0162027 A1* | 7/2008 | Murphy | G05D 1/0246 |
| | | | 701/117 |
| 2009/0109061 A1* | 4/2009 | McNew | G08G 1/164 |
| | | | 340/928 |
| 2013/0238167 A1* | 9/2013 | Stanfield | B60Q 1/2696 |
| | | | 701/2 |
| 2014/0129073 A1* | 5/2014 | Ferguson | G05D 1/00 |
| | | | 701/23 |
| 2015/0194082 A1* | 7/2015 | McEwan | B60R 13/105 |
| | | | 40/209 |
| 2015/0243167 A1* | 8/2015 | Stahlin | H04W 4/46 |
| | | | 340/902 |
| 2015/0258928 A1* | 9/2015 | Goto | B60Q 1/24 |
| | | | 701/49 |
| 2016/0318490 A1* | 11/2016 | Ben Shalom | B60T 7/18 |
| 2017/0084174 A1* | 3/2017 | Suzuki | B60W 30/00 |
| 2017/0088039 A1* | 3/2017 | Williams | B60Q 1/50 |
| 2017/0088040 A1* | 3/2017 | Williams | B60Q 1/50 |
| 2017/0103650 A1* | 4/2017 | Amadon | G08G 1/095 |
| 2017/0148317 A1* | 5/2017 | Diba | G08G 1/056 |
| 2017/0213462 A1* | 7/2017 | Prokhorov | G08G 1/0965 |
| 2017/0305335 A1* | 10/2017 | Wei | B60Q 1/50 |
| 2017/0329337 A1* | 11/2017 | Kusano | G08G 1/09675 |
| 2017/0337819 A1* | 11/2017 | Wei | G08G 1/163 |
| 2017/0350573 A1* | 12/2017 | Fleszewski | F21V 7/0083 |
| 2018/0004223 A1* | 1/2018 | Baldwin | G05D 1/0248 |
| 2018/0090001 A1* | 3/2018 | Fletcher | B60W 20/12 |
| 2018/0118099 A1* | 5/2018 | Kunii | H04N 9/3179 |
| 2018/0173237 A1* | 6/2018 | Reiley | G05D 1/0061 |
| 2018/0286232 A1* | 10/2018 | Shau | G08G 1/09623 |
| 2018/0326982 A1* | 11/2018 | Paris | B60W 50/0097 |
| 2018/0329418 A1* | 11/2018 | Baalke | G08G 1/09623 |
| 2019/0001993 A1* | 1/2019 | Visintainer | B60W 30/0953 |
| 2019/0043353 A1* | 2/2019 | Kim | G05D 1/0274 |
| 2019/0051158 A1* | 2/2019 | Felip Leon | G08G 1/22 |
| 2019/0088148 A1* | 3/2019 | Jacobus | B60W 30/09 |
| 2019/0215671 A1* | 7/2019 | Takii | H04L 51/38 |
| 2019/0329771 A1* | 10/2019 | Wray | B60W 30/09 |
| 2020/0005645 A1* | 1/2020 | Wray | G08G 1/096758 |
| 2020/0031337 A1* | 1/2020 | Soltanian | B60W 30/0956 |
| 2020/0073382 A1* | 3/2020 | Noda | G05D 1/0276 |
| 2020/0294431 A1* | 9/2020 | Nakajima | G09F 19/18 |
| 2020/0349836 A1* | 11/2020 | Shibata | G08G 1/0965 |

FOREIGN PATENT DOCUMENTS

| | | |
|---|---|---|
| CN | 105957376 A | 9/2016 |
| CN | 109313858 A | 2/2019 |
| WO | WO2018/147871 A1 | 8/2018 |

* cited by examiner

Determining, in response to determining that a running route of an autonomous vehicle at a currently arriving intersection overlaps with a running route of an opposing vehicle at the currently arriving intersection, a party having a right of way at the currently arriving intersection from the autonomous vehicle and the opposing vehicle based on the running route of the autonomous vehicle and the running route of the opposing vehicle — 201

Generating and transmitting a prompt message based on a determining result of the right of way — 202

METHOD AND APPARATUS FOR VEHICLE INTERACTION FOR AUTONOMOUS VEHICLE

INCORPORATION BY REFERENCE

An Application Data Sheet is filed concurrently with this specification as part of the present application. Each application that the present application claims benefit of or priority to as identified in the concurrently filed Application Data Sheet is incorporated by reference herein in its entirety and for all purposes.

TECHNICAL FIELD

Embodiments of the present disclosure relate to the field of computer technology, specifically to the field of Internet technology, and more specifically to a method and apparatus for vehicle interaction for an autonomous vehicle.

BACKGROUND

It is inevitable for a vehicle, when running on a road surface, to interact with pedestrians and vehicles on the road surface. A driver in the vehicle, when driving, may communicate with other drivers by various approaches, such as gestures and expressions.

Normal operation of an autonomous vehicle cannot meet the above-mentioned needs for interaction with other vehicles or vehicle drivers. Especially in rush hours of traffic flow, a situation in which two vehicles are deadlocked may take place, thereby resulting in traffic congestion.

SUMMARY

Embodiments of the present disclosure present a method and apparatus for vehicle interaction for an autonomous vehicle.

In a first aspect, an embodiment of the present disclosure provides a method for vehicle interaction for an autonomous vehicle, including: determining, in response to determining that a running route of the autonomous vehicle at a currently arriving intersection overlaps with a running route of an opposing vehicle at the currently arriving intersection, a party having a right of way at the currently arriving intersection from the autonomous vehicle and the opposing vehicle based on the running route of the autonomous vehicle and the running route of the opposing vehicle; and generating and transmitting a prompt message based on a determining result of the right of way, the prompt message being used for prompting the party having the right of way to go first and a party having no right of way to give way.

In some embodiments, the prompt message includes a first prompt message for prompting the opposing vehicle to go first, and a second prompt message for prompting the opposing vehicle to give way; and the generating and transmitting a prompt message based on a determining result of the right of way includes: generating and transmitting, in response to determining that the opposing vehicle has the right of way, the first prompt message for prompting the opposing vehicle to go first; and generating and transmitting, in response to determining that the autonomous vehicle has the right of way, the second prompt message for prompting the opposing vehicle to give way.

In some embodiments, a vehicle head of the autonomous vehicle is provided with a display screen, and the second prompt message includes screen display information for prompting the opposing vehicle to give way; and the generating and transmitting the second prompt message for prompting the opposing vehicle to give way includes: generating the screen display information for prompting the opposing vehicle to give way, and transmitting the screen display information to the display screen for display.

In some embodiments, the generating the screen display information for prompting the opposing vehicle to give way includes: generating, in response to determining that a number of opposing vehicles is less than or equal to a preset threshold, the screen display information for prompting the opposing vehicle to give way.

In some embodiments, the autonomous vehicle is provided with a spot lamp, and the second prompt message includes spot lamp projection information for prompting the opposing vehicle to give way; and the generating and transmitting the second prompt message for prompting the opposing vehicle to give way includes: determining, in response to determining that a number of opposing vehicles is greater than a preset threshold, a current interactive vehicle of the autonomous vehicle from the opposing vehicles; and generating the spot lamp projection information for prompting the opposing vehicle to give way, and transmitting the spot lamp projection information to the spot lamp of the autonomous vehicle for projection in front of the interactive vehicle.

In some embodiments, the vehicle head of the autonomous vehicle is provided with a display screen, and the first prompt message includes screen display information for prompting the opposing vehicle to go first; and the generating and transmitting the first prompt message for prompting the opposing vehicle to go first includes: generating the screen display information for prompting the opposing vehicle to go first, and transmitting the screen display information to the display screen of the autonomous vehicle for display.

In some embodiments, the generating the screen display information for prompting the opposing vehicle to go first includes: generating, in response to determining that a number of opposing vehicles is less than or equal to the preset threshold, the screen display information for prompting the opposing vehicle to go first.

In some embodiments, the autonomous vehicle is provided with the spot lamp, and the first prompt message includes spot lamp projection information for prompting the opposing vehicle to go first; and the generating and transmitting the first prompt message for prompting the opposing vehicle to go first includes: determining, in response to determining that a number of opposing vehicles is greater than a preset threshold, the current interactive vehicle of the autonomous vehicle from the opposing vehicles; and generating the spot lamp projection information for prompting the opposing vehicle to go first, and transmitting the spot lamp projection information to the spot lamp of the autonomous vehicle for projection in front of the interactive vehicle.

In some embodiments, the generating and transmitting, in response to determining that the autonomous vehicle has the right of way, the second prompt message for prompting the opposing vehicle to give way includes: generating and transmitting the second prompt message, in response to determining that the autonomous vehicle has the right of way and the opposing vehicle is in a state of waiting for going.

In some embodiments, after generating and transmitting the second prompt message, the method further includes: transmitting, in response to determining that the opposing vehicle fails to give way, a third prompt message for warning the opposing vehicle to stop.

In some embodiments, after transmitting a third prompt message for warning the opposing vehicle to stop, the method further includes: issuing, in response to determining that a distance between the autonomous vehicle and the opposing vehicle meets a preset collision warning condition, an instruction for stopping running of the autonomous vehicle; and acquiring vehicle information of the opposing vehicle, generating a corresponding running behavior record based on the vehicle information, and transmitting the running behavior record to a vehicle management platform server.

In some embodiments, the method further includes: generating and transmitting a fourth prompt message, where the fourth prompt message is used for prompting a vehicle in a same running direction as the autonomous vehicle to obey a traffic rule.

In some embodiments, the autonomous vehicle is provided with a rear display screen and a lateral display screen, and the fourth prompt message includes screen display information for prompting the vehicle in the same running direction as the autonomous vehicle to obey the traffic rule; and the generating and transmitting the fourth prompt message includes: generating the screen display information for prompting the vehicle in the same running direction as the autonomous vehicle to obey the traffic rule, and transmitting the screen display information to at least one of the rear display screen or the lateral display screen of the autonomous vehicle for display.

In some embodiments, the at least one of the rear display screen or the lateral display screen includes: a screen in a direction of detecting the vehicle in the same running direction as the autonomous vehicle in the rear screen and the lateral screen.

In a second aspect, an embodiment of the present disclosure provides an apparatus for vehicle interaction, including: a determining unit configured to determine, in response to determining that a running route of the autonomous vehicle at a currently arriving intersection overlaps with a running route of an opposing vehicle at the currently arriving intersection, a party having a right of way at the currently arriving intersection from the autonomous vehicle and the opposing vehicle based on the running route of the autonomous vehicle and the running route of the opposing vehicle; and a transmitting unit configured to generate and transmit a prompt message based on a determining result of the right of way, the prompt message being used for prompting the party having the right of way to go first and a party having no right of way to give way.

In some embodiments, the prompt message includes a first prompt message for prompting the opposing vehicle to go first, and a second prompt message for prompting the opposing vehicle to give way; and the transmitting unit is further configured to execute the generating and transmitting the prompt message based on the determining result of the right of way as follows: generating and transmitting, in response to determining that the opposing vehicle has the right of way, the first prompt message for prompting the opposing vehicle to go first; and generating and transmitting, in response to determining that the autonomous vehicle has the right of way, the second prompt message for prompting the opposing vehicle to give way.

In some embodiments, a vehicle head of the autonomous vehicle is provided with a display screen, and the second prompt message includes screen display information for prompting the opposing vehicle to give way; and the transmitting unit is further configured to execute the generating and transmitting the second prompt message for prompting the opposing vehicle to give way as follows: generating the screen display information for prompting the opposing vehicle to give way, and transmitting the screen display information to the display screen for display.

In some embodiments, the transmitting unit is further configured to execute the generating the screen display information for prompting the opposing vehicle to give way as follows: generating, in response to determining that a number of opposing vehicles is less than or equal to a preset threshold, the screen display information for prompting the opposing vehicle to give way.

In some embodiments, the autonomous vehicle is provided with a spot lamp, and the second prompt message includes spot lamp projection information for prompting the opposing vehicle to give way; and the transmitting unit is further configured to execute the generating and transmitting the second prompt message for prompting the opposing vehicle to give way as follows: determining, in response to determining that the number of opposing vehicles is greater than the preset threshold, a current interactive vehicle of the autonomous vehicle from the opposing vehicles; and generating the spot lamp projection information for prompting the opposing vehicle to give way, and transmitting the spot lamp projection information to the spot lamp of the autonomous vehicle for projection in front of the interactive vehicle.

In some embodiments, the vehicle head of the autonomous vehicle is provided with a display screen, and the first prompt message includes screen display information for prompting the opposing vehicle to go first; and the transmitting unit is further configured to execute the generating and transmitting the first prompt message for prompting the opposing vehicle to give way as follows: generating the screen display information for prompting the opposing vehicle to go first, and transmitting the screen display information to the display screen of the autonomous vehicle for display.

In some embodiments, the transmitting unit is further configured to execute the generating the screen display information for prompting the opposing vehicle to go first as follows: generating, in response to determining that the number of opposing vehicles is less than or equal to the preset threshold, the screen display information for prompting the opposing vehicle to go first.

In some embodiments, the autonomous vehicle is provided with a spot lamp, and the first prompt message includes spot lamp projection information for prompting the opposing vehicle to go first; and the transmitting unit is further configured to execute the generating and transmitting the first prompt message for prompting the opposing vehicle to give way as follows: determining, in response to determining that the number of opposing vehicles is greater than the preset threshold, the current interactive vehicle of the autonomous vehicle from the opposing vehicles; and generating the spot lamp projection information for prompting the opposing vehicle to go first, and transmitting the spot lamp projection information to the spot lamp of the autonomous vehicle for projection in front of the interactive vehicle.

In some embodiments, the transmitting unit is further configured to execute the generating and transmitting, in response to determining that the autonomous vehicle has the right of way, the second prompt message for prompting the opposing vehicle to give way as follows: generating and transmitting the second prompt message, in response to determining that the autonomous vehicle has the right of way and the opposing vehicle is in a state of waiting for going.

In some embodiments, the apparatus further includes: a warning unit configured to transmit, in response to determining that the opposing vehicle fails to give way, a third prompt message for warning the opposing vehicle to stop.

In some embodiments, the apparatus further includes: a stopping unit configured to issue, in response to determining that a distance between the autonomous vehicle and the opposing vehicle meets a preset collision warning condition, an instruction for stopping running of the autonomous vehicle; and an uploading unit configured to acquire vehicle information of the opposing vehicle, generate a corresponding running behavior record based on the vehicle information, and transmit the running behavior record to a vehicle management platform server.

In some embodiments, the apparatus further includes: a same running direction prompting unit configured to generate and transmit a fourth prompt message, where the fourth prompt message is used for prompting a vehicle in a same running direction as the autonomous vehicle to obey a traffic rule.

In some embodiments, the autonomous vehicle is provided with a rear display screen and a lateral display screen, and the fourth prompt message includes screen display information for prompting the vehicle in the same running direction as the autonomous vehicle to obey the traffic rule; and the same running direction prompting unit is further configured to execute the generating and transmitting the fourth prompt message as follows, including: generating the screen display information for prompting the vehicle in the same running direction as the autonomous vehicle to obey the traffic rule, and transmitting the screen display information to at least one of the rear display screen or the lateral display screen of the autonomous vehicle for display.

In some embodiments, the at least one of the rear display screen or the lateral display screen includes: a screen in a direction of detecting the vehicle in the same running direction as the autonomous vehicle in the rear screen and the lateral screen.

In a third aspect, an embodiment of the present disclosure provides an electronic device, including: one or more processors; and a storage apparatus configured to store one or more programs, where the one or more programs, when executed by the one or more processors, cause the one or more processors to implement the method of for vehicle interaction for an autonomous vehicle according to any embodiment of the disclosure.

In a fourth aspect, an embodiment of the present disclosure provides a computer readable storage medium, storing a computer program thereon, where the program, when executed by a processor, causes the processor to implement the method for vehicle interaction for an autonomous vehicle according to any embodiment of the disclosure.

The scheme for vehicle interaction provided by the embodiments of the present disclosure first determines, in response to determining that a running route of the autonomous vehicle at a currently arriving intersection overlaps with a running route of an opposing vehicle at the currently arriving intersection, a party having a right of way at the currently arriving intersection from the autonomous vehicle and the opposing vehicle based on the running route of the autonomous vehicle and the running route of the opposing vehicle, and then generates and transmits a prompt message based on a determining result of the right of way, the prompt message being used for prompting the party having the right of way to go first while a party having no right of way to give way.

The embodiments of the present disclosure may prompt interaction with other vehicles, to make the opposing vehicle go first or give way, and then allow the autonomous vehicle and the opposing vehicle to go through the intersection as quickly as possible, thereby avoiding intersection congestion caused by rushing between the vehicles.

BRIEF DESCRIPTION OF THE DRAWINGS

After reading detailed description of non-limiting embodiments with reference to the following accompanying drawings, other features, objectives and advantages of the present disclosure will become more apparent.

DETAILED DESCRIPTION OF EMBODIMENTS

The present disclosure will be further described below in detail in combination with the accompanying drawings and embodiments. It should be understood that the specific embodiments described herein are merely used for explaining the relevant disclosure, rather than limiting the disclosure. In addition, it should be further noted that, for the ease of description, only the parts related to the relevant disclosure are shown in the accompanying drawings.

It should be noted that the embodiments in the present disclosure and the features in the embodiments may be combined with each other on a non-conflict basis. The present disclosure will be described below in detail with reference to the accompanying drawings and in combination with the embodiments.

Figure 1:
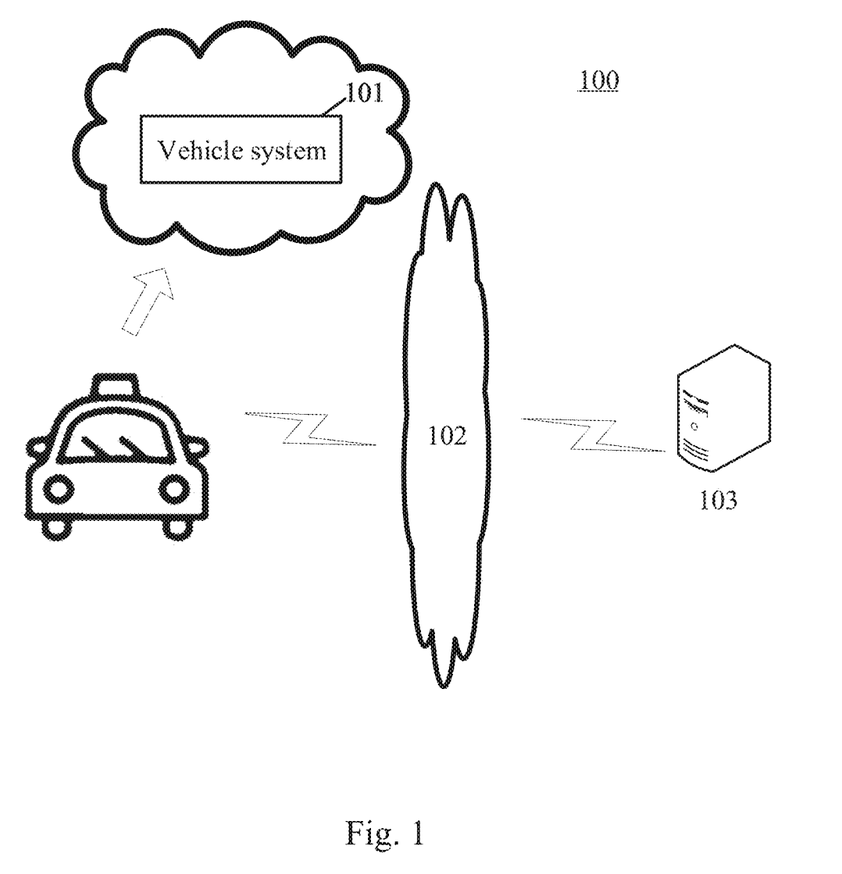
FIG. 1 is an architectural diagram of an exemplary system in which embodiments of the present disclosure may be applied.

FIG. 1 shows an exemplary system architecture 100 in which a method for vehicle interaction for an autonomous vehicle or an apparatus for vehicle interaction for an autonomous vehicle of embodiments of the present disclosure may be applied.

As shown in FIG. 1, the system architecture 100 may include a vehicle system 101 of the autonomous vehicle, a network 102, and a server 103. The network 102 serves as a medium providing a communication link between the vehicle system 101 and the server 103. The network 102 may include various types of connections, such as wired or wireless communication links, or optical fibers.

The vehicle system 101 may interact with the server 103 via the network 102, for example, to receive or transmit a message. The vehicle system 101 may be connected to a system module or component, such as a powertrain, a drive system, a power system, a control system, and a sensor, of the autonomous vehicle, to acquire data of the system modules or components, process the data, and send the data to the server 103 via the network.

The vehicle system 101 here may be hardware or software. The autonomous vehicle here is a vehicle having an automatic driving functionality. When the vehicle system 101 is hardware, the vehicle system may be a vehicle-mounted electronic device carried by the autonomous vehicle. When the vehicle system 101 is software, the vehicle system may be installed in the vehicle-mounted electronic device, may be implemented as a plurality of software programs or software modules (e.g., software programs or software modules configured to provide distributed services), or may be implemented as a single software program or software module. This is not specifically limited here.

The server 103 may be a server providing various services, such as a back-end server providing support for the vehicle system 101. The back-end server may process, e.g., analyze, received data of the autonomous vehicle, and returns the processing result to the vehicle system 101.

It should be noted that the method for vehicle interaction for an autonomous vehicle provided by embodiments of the present disclosure may be executed by the server 103 or the vehicle system 101. Accordingly, the apparatus for vehicle interaction for an autonomous vehicle may be provided in the server 103 or the vehicle system 101.

It should be understood that the numbers of vehicle systems, networks, and servers in FIG. 1 are merely illustrative. Any number of vehicle systems, networks, and servers may be provided based on actual requirements.

Figure 2:
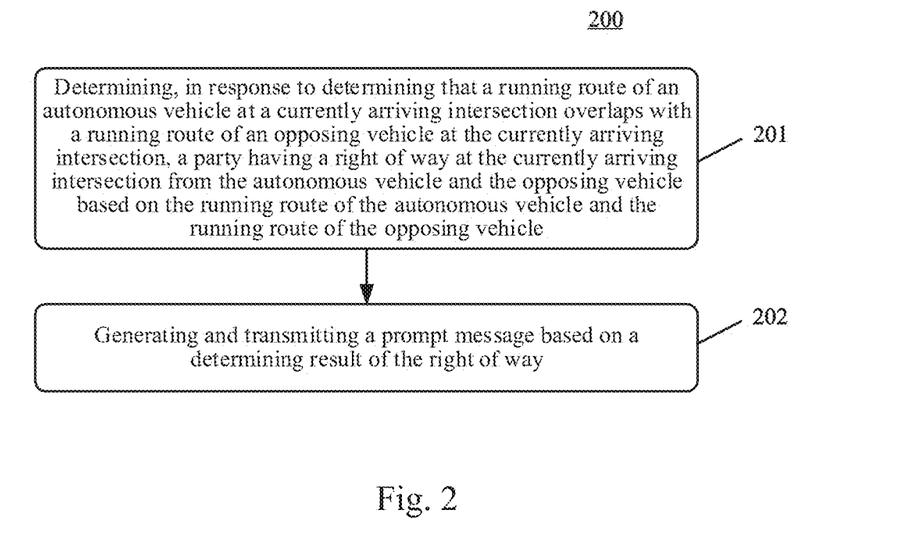
FIG. 2 is a flowchart of a method for vehicle interaction for an autonomous vehicle according to an embodiment of the present disclosure.

Further referring to FIG. 2, a process 200 of a method for vehicle interaction for an autonomous vehicle according to an embodiment of the present disclosure is shown. The method for vehicle interaction for an autonomous vehicle includes the following steps.

Step 201: determining, in response to determining that a running route of an autonomous vehicle at a currently arriving intersection overlaps with a running route of an opposing vehicle at the currently arriving intersection, a party having a right of way at the currently arriving intersection from the autonomous vehicle and the opposing vehicle based on the running route of the autonomous vehicle and the running route of the opposing vehicle.

In the present embodiment, an executing body (e.g., the vehicle system shown in FIG. 1) of the method for vehicle interaction for an autonomous vehicle may determine, in response to determining that a running route of the autonomous vehicle at a currently arriving intersection overlaps with a running route of an opposing vehicle, a party having a right of way at the currently arriving intersection from the autonomous vehicle and the opposing vehicle based on the running route of the autonomous vehicle and the running route of the opposing vehicle. Specifically, when going through the intersection, a vehicle opposite to the intersection is the opposing vehicle. The right of way, i.e., a priority of starting, refers to a right of a road user to preferentially go, as determined based on a traffic rule. For example, in the case where a turning vehicle and a straight-going vehicle will run into a given road, the straight-going vehicle has the right of way.

The overlapping with the running route of the opposing vehicle generally refers to partially consistent running routes, e.g., route intersection, and may also mean that the two vehicles will run into a given road. The given road here may be different lanes in a given direction in parallel. For example, the autonomous vehicle turns left, while the opposing vehicle goes straight or turns right. Alternatively, the autonomous vehicle goes straight or turns right, while the opposing vehicle turns left.

In practice, the route of the opposing vehicle may be determined by various approaches. For example, the route of the opposing vehicle may be determined by whether the opposing vehicle turns on a turn signal. If the vehicle turns on the turn signal, then the opposing vehicle being about to make a turn may be determined. Alternatively, whether the opposing vehicle is about to make a turn is determined based on a size of a deflection angle of the vehicle head of the opposing vehicle. For example, if the deflection angle is greater than or equal to an angle threshold, then the deflection angle shows the opposing vehicle being about to make a turn. Alternatively, whether the route of the opposing vehicle overlaps with the route of the autonomous vehicle may be determined based on whether lane information of a lane where the opposing vehicle is located and navigation route information of the autonomous vehicle. For example, the opposite vehicle is located on a left-turn lane, and the navigation route of the autonomous vehicle is straight going, then the route of the autonomous vehicle overlaps with the route of the opposing vehicle at a current intersection. Navigation route information of the opposing vehicle may be further acquired to determine whether the route of the autonomous vehicle overlaps with and the route of the opposing vehicle at the current intersection based on the navigation route information of the autonomous vehicle and the navigation route information of the opposing vehicle. If there is more than one opposing vehicle, a running route of the first vehicle in an opposing vehicle queue is generally to be determined.

Step 202: generating and transmitting a prompt message based on a determining result of the right of way, the prompt message being used for prompting the party having the right of way to go first and a party having no right of way to give way.

In the present embodiment, the executing body may generate the prompt message based on the determining result of the right of way, and transmit the prompt message. Here, the executing body may transmit the prompt message to other components of the autonomous vehicle or an apparatus connected to the autonomous vehicle, for example, to store, display, or play the prompt message. In addition, the executing body may further transmit the prompt message to other vehicles, such as the opposing vehicle. For instance, if the determining result is the autonomous vehicle having the right of way, then the executing body may transmit a prompt message for prompting and requesting the opposing vehicle to give way to the opposing vehicle, to prompt the opposing vehicle to give way. For example, the prompt message may be "please wait for a moment."

Figure 3:
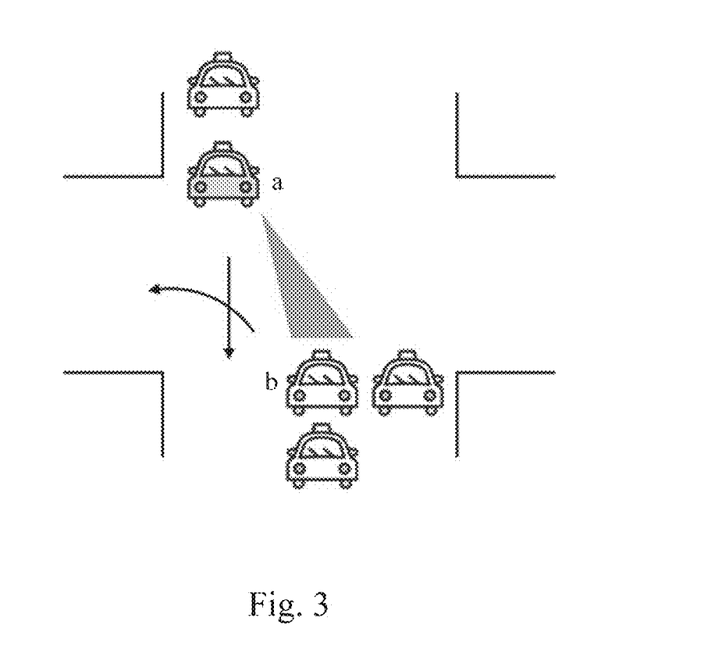
FIG. 3 is a schematic diagram of an application scenario of the method for vehicle interaction for an autonomous vehicle according to an embodiment of the present disclosure.

Further referring to FIG. 3, FIG. 3 is a schematic diagram of an application scenario of the method for vehicle interaction for an autonomous vehicle according to the present embodiment. In the application scenario in FIG. 3, the executing body may determine, in response to determining that a running route of an autonomous vehicle "a" at a currently arriving intersection overlaps with a running route of an opposing vehicle "b" at the currently arriving intersection, a party having a right of way at the currently arriving intersection from the autonomous vehicle and the opposing vehicle based on the running route of the autonomous vehicle and the running route of the opposing vehicle.

As indicated by two crossed arrows in FIG. 3, there is a crossing between the running routes. A prompt message "please wait for a moment" is generated and transmitted based on a determining result of the right of way, the prompt message being used for prompting the party having the right of way to go first while a party having no right of way to give way.

The method provided by the above embodiments of the present disclosure may prompt interaction with other vehicles, to make the opposing vehicle go first or give way, and then allow the autonomous vehicle and the opposing vehicle to go through the intersection as quickly as possible, thereby avoiding intersection congestion caused by rushing between the vehicles.

Figure 4:
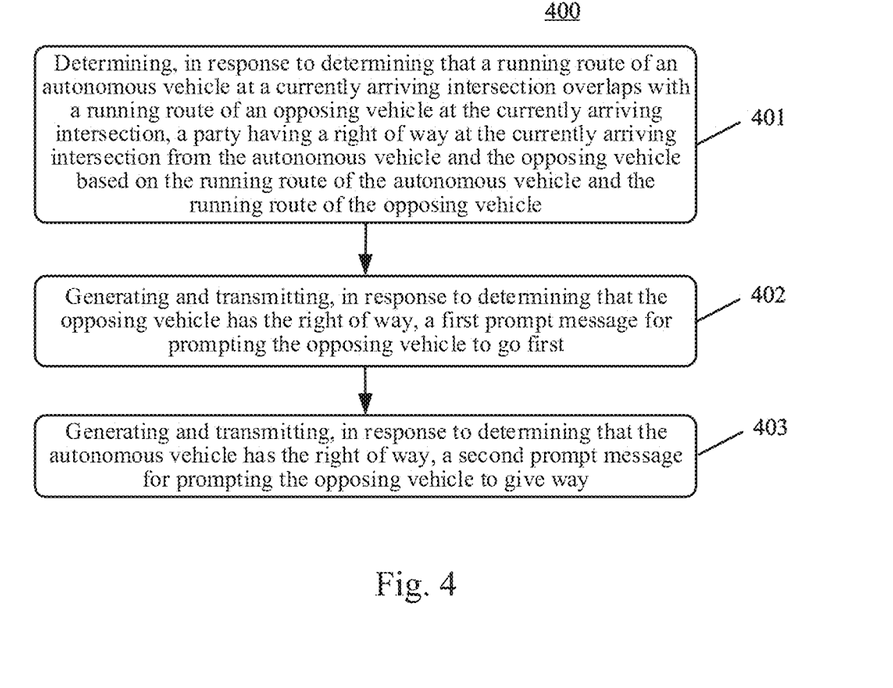
FIG. 4 is a flowchart of the method for vehicle interaction for an autonomous vehicle according to another embodiment of the present disclosure.

Further referring to FIG. 4, a process 400 of the method for vehicle interaction for an autonomous vehicle according to another embodiment is shown. The process 400 of the method for vehicle interaction for an autonomous vehicle includes the following steps.

Step 401: determining, in response to determining that a running route of an autonomous vehicle at a currently arriving intersection overlaps with a running route of an opposing vehicle at the currently arriving intersection, a party having a right of way at the currently arriving intersection from the autonomous vehicle and the opposing vehicle based on the running route of the autonomous vehicle and the running route of the opposing vehicle.

In the present embodiment, an executing body (e.g., the vehicle system shown in FIG. 1) of the method for vehicle interaction for an autonomous vehicle may determine, in response to determining that a running route of the autonomous vehicle at a currently arriving intersection overlaps with a running route of an opposing vehicle, a party having a right of way at the currently arriving intersection from the autonomous vehicle and the opposing vehicle based on the running route of the autonomous vehicle and the running route of the opposing vehicle. The right of way, i.e., a priority of starting, refers to a right of a road user to preferentially go.

Step 402: generating and transmitting, in response to determining that the opposing vehicle has the right of way, a first prompt message for prompting the opposing vehicle to go first.

In the present embodiment, the prompt message generated by the executing body includes a first prompt message. The first prompt message is used for prompting the opposing vehicle to go first. The executing body may generate the first prompt message, in response to determining that the opposing vehicle has the right of way. The first prompt message may prompt the opposing vehicle to go first, thereby avoiding a situation that the opposing vehicle merely takes a wait-and-see approach, and delays in running, and then accelerating exit of the opposing vehicle. For example, the first prompt message may be "please go."

Step 403: generating and transmitting, in response to determining that the autonomous vehicle has the right of way, a second prompt message for prompting the opposing vehicle to give way.

In the present embodiment, the prompt message generated by the executing body further includes a second prompt message. The second prompt message is used for prompting the opposing vehicle to give way. The executing body may generate the second prompt message, in response to determining that the autonomous vehicle has the right of way. The second prompt message may prompt the opposing vehicle to give way, thereby reducing occurrence of a situation that the opposing vehicle rushes to go without obeying a traffic rule, and then ensuring smoothly passing of the autonomous vehicle to a certain extent. For example, the second prompt message may be "please wait for a moment."

In some alternative implementations of the present embodiment, a vehicle head of the autonomous vehicle is provided with a display screen, and the second prompt message includes screen display information for prompting the opposing vehicle to give way; and the generating and transmitting the second prompt message for prompting the opposing vehicle to give way in step 403 includes: generating the screen display information for prompting the opposing vehicle to give way, and transmitting the screen display information to the display screen for display.

In these alternative implementations, the screen display information for prompting the opposing vehicle to give way may be displayed to the opposing vehicle via the display screen of the vehicle head of the autonomous vehicle, such that the opposing vehicle can detect displayed content or the driver of the opposing vehicle can see the displayed content. Specifically, the display screen of the vehicle head may be provided on the windshield of the vehicle head, or may be an external display screen with a display direction being the vehicle head direction.

In these implementations, the screen display information may be very intuitively displayed to the opposing vehicle at the vehicle head. Thus, the opposing vehicle fast acquires the information to make avoidance as quickly as possible, such that the autonomous vehicle quickly goes through the intersection.

In some alternative application scenarios of these implementations, the generating the screen display information for prompting the opposing vehicle to give way includes: generating, in response to determining that a number of opposing vehicles is less than or equal to a preset threshold, the screen display information for prompting the opposing vehicle to give way.

In these alternative application scenarios, the executing body may generate, in response to determining that the number of opposing vehicles is less than or equal to the preset threshold, the screen display information for prompting the opposing vehicle to give way. For instance, if there is merely one opposing vehicle, then the screen display information for prompting the opposing vehicle to give way may be generated, and displayed on the display screen of the vehicle head.

In these application scenarios, the executing body may display the screen display information for prompting to give way to the opposing vehicle via the display screen of the vehicle head in the case where there are fewer opposing vehicles, to avoid interfering rear-ranked vehicles in an opposing vehicle queue by the screen display information of the autonomous vehicle in the case where there are many opposing vehicles.

In some alternative implementations of the present embodiment, the autonomous vehicle is provided with a spot lamp, and the second prompt message includes spot lamp projection information for prompting the opposing vehicle to give way; and the generating and transmitting the second prompt message for prompting the opposing vehicle to give way in step 403 includes: determining, in response to determining that the number of opposing vehicles is greater than the preset threshold, a current interactive vehicle of the autonomous vehicle from the opposing vehicles; and generating the spot lamp projection information for prompting the opposing vehicle to give way, and transmitting the spot lamp projection information to the spot lamp of the autonomous vehicle for projection in front of the interactive vehicle.

In these alternative implementations, in the case where there are many opposing vehicles, the executing body may transmit the spot lamp projection information to the spot lamp of the autonomous vehicle, such that the spot lamp projects the spot lamp projection information for prompting to give way in front of the interactive vehicle. In this way, a very explicit instruction may be given to the interactive vehicle, such that the interactive vehicle gives way. Specifically, the executing body may determine the interactive vehicle by various approaches. For example, an opposing vehicle closest to the autonomous vehicle among the opposing vehicles may be used as the interactive vehicle. Alternatively, a queue head vehicle in the opposing vehicle queue starting from the intersection may be used as the interactive vehicle.

In practice, the spot lamp projection information may be information projected onto the road surface. In the case where the interactive vehicle is moving, the projection position of the spot lamp projection information may change accordingly. Specifically, the executing body may detect a position of the vehicle head of the opposing vehicle, and project the spot lamp projection information onto the ground in front of the vehicle head of the opposing vehicle.

In these implementations, compared with the screen display information, an explicit instruction may be given to the interactive vehicle in the case where there are many interactive vehicles, such that the interactive vehicle makes avoidance. At the same time, interference with other vehicles except for the interactive vehicle may be avoided.

In some alternative implementations of the present embodiment, the vehicle head of the autonomous vehicle is provided with the display screen, and the first prompt message includes screen display information for prompting the opposing vehicle to go first; and the generating and transmitting the first prompt message for prompting the opposing vehicle to go first in step 402 includes: generating the screen display information for prompting the opposing vehicle to go first, and transmitting the screen display information to the display screen of the autonomous vehicle for display.

In these alternative implementations, the screen display information for prompting the opposing vehicle to go first may be displayed to the opposing vehicle via the display screen of the vehicle head of the autonomous vehicle, such that the opposing vehicle can detect displayed content or the driver of the opposing vehicle can see the displayed content.

In these implementations, the screen display information may be very intuitively displayed to the opposing vehicle at the vehicle head, such that the opposing vehicle fast acquires the information, so as to go through the intersection as quickly as possible.

In some alternative application scenarios of these implementations, the generating the screen display information for prompting the opposing vehicle to go first includes: generating, in response to determining that the number of opposing vehicles is less than or equal to the preset threshold, the screen display information for prompting the opposing vehicle to go first.

In these alternative application scenarios, the executing body may generate, in the case of determining that the number of opposing vehicles is less than or equal to the preset threshold, the screen display information for prompting the opposing vehicle to go first. For instance, if there is merely one opposing vehicle, then the screen display information for prompting the opposing vehicle to go first may be generated, and displayed on the display screen of the vehicle head.

In these application scenarios, the executing body may display the screen display information for prompting to go first to the opposing vehicle via the display screen of the vehicle head in the case where there are fewer opposing vehicles, to avoid interfering rear-ranked vehicles in the opposing vehicle queue by the screen display information of the autonomous vehicle in the case where there are many opposing vehicles.

In some alternative implementations of the present embodiment, the autonomous vehicle is provided with a spot lamp, and the first prompt message includes spot lamp projection information for prompting the opposing vehicle to go first; and the generating and transmitting the first prompt message for prompting the opposing vehicle to go first in step 402 includes: determining, in response to determining that the number of opposing vehicles is greater than the preset threshold, the current interactive vehicle of the autonomous vehicle from the opposing vehicles; and generating the spot lamp projection information for prompting the opposing vehicle to go first, and transmitting the spot lamp projection information to the spot lamp of the autonomous vehicle for projection in front of the interactive vehicle.

In these alternative implementations, in the case where there are many opposing vehicles, the executing body may transmit the spot lamp projection information to the spot lamp of the autonomous vehicle, such that the spot lamp projects the spot lamp projection information for prompting to go first in front of the interactive vehicle. In this way, a very explicit instruction may be given to the interactive vehicle, such that the interactive vehicle goes first.

In these implementations, compared with the screen display information, an explicit instruction may be given to the interactive vehicle in the case where there are many interactive vehicles, such that the interactive vehicle goes first to prevent the opposing vehicle from staying at the intersection and occupying the running position. At the same time, interference with other vehicles except for the interactive vehicle may be avoided.

In some alternative implementations of the present embodiment, the generating and transmitting, in response to determining that the autonomous vehicle having the right of way, the second prompt message for prompting the opposing vehicle to give way in step 403 includes: generating and transmitting the second prompt message, in response to determining that the autonomous vehicle has the right of way and the opposing vehicle is in a state of waiting for going.

In these alternative implementations, the executing body may generate and transmit the second prompt message, in response to determining that the autonomous vehicle has the right of way and the opposing vehicle is in a state of waiting for going. Specifically, the state of waiting for going is a state of failure to go through the intersection, such as a stopping state behind a stop line or in a left-turn waiting area. Before the opposing vehicle starts to run, the second prompt message may be transmitted to prompt the opposing vehicle to give way.

In these implementations, the opposing vehicle may be promptly prompted to give way when the opposing vehicle has not gone through the intersection, thereby preventing the opposing vehicle from rushing to the greatest extent, and improving the efficiency of the autonomous vehicle in going through the intersection.

In some alternative application scenarios of these implementations, after generating and transmitting the second prompt message, the method may further include: transmitting, in response to determining that the opposing vehicle fails to give away, a third prompt message for warning the opposing vehicle to stop.

In these alternative application scenarios, the executing body may transmit the third prompt message, in response to determining that the opposing vehicle still does not give way after transmitting the second prompt message, to warn the opposing vehicle to stop to obey the traffic rule. For example, the third prompt message may be screen display information or spot lamp projection information, such as "please stop immediately." Furthermore, the third prompt message may further be whistle information transmitted to a speaker of the autonomous vehicle, such that the autonomous vehicle may whistle to prompt the opposing vehicle that is still running to stop. It should be noted that the third prompt message may be any one piece, or any two pieces of the screen display information, the spot lamp projection information, or the whistle information, or a combination of the three.

In these application scenarios, in the case where the opposing vehicle rushes to go, the third prompt message may be transmitted for warning, to further urge the opposing vehicle to make avoidance, such that the autonomous vehicle goes through the intersection.

In some alternative situations of these application scenarios, after transmitting the third prompt message for warning the opposing vehicle to stop, the method may further include: issuing, in response to determining that a distance between the autonomous vehicle and the opposing vehicle meets a preset collision warning condition, an instruction for stopping running of the autonomous vehicle; and acquiring vehicle information of the opposing vehicle, generating a corresponding running behavior record based on the vehicle information, and transmitting the running behavior record to a vehicle management platform server.

In these alternative situations, the executing body may issue a stop instruction to the autonomous vehicle, in response to determining that the distance between the autonomous vehicle and the opposing vehicle meets the preset collision warning condition, and may transmit the vehicle information of the opposing vehicle to the vehicle management platform server.

In these situations, the occurrence of a traffic accident may be avoided by determining whether the collision warning condition is met, and the vehicle information of the rushing opposing vehicle may be uploaded, to run carefully when encountering the opposing vehicle next time.

In some alternative implementations of the above embodiments described in combination with FIG. 2 and FIG. 4, the method may further include: generating and transmitting a fourth prompt message, where the fourth prompt message is used for prompting a vehicle in a same running direction as the autonomous vehicle to obey the traffic rule.

In these alternative implementations, the executing body may generate and transmit the fourth prompt message for prompting the vehicle in the same running direction as the autonomous vehicle to obey the traffic rule, for example, to prevent the vehicle in the same running direction as the autonomous vehicle from overtaking or rushing. For example, the fourth prompt message may be "please obey the traffic rule."

In these implementations, the vehicle in the same running direction as the autonomous vehicle may be prevented from causing running obstacles to the autonomous vehicle, such that the autonomous vehicle goes through the intersection as quickly as possible.

In some alternative application scenarios of these implementations, the autonomous vehicle is provided with display screens in a rear direction and a lateral direction (i.e, a rear display screen and a lateral display screen), and the fourth prompt message includes screen display information for prompting the vehicle in the same running direction as the autonomous vehicle to obey the traffic rule; and the generating and transmitting the fourth prompt message includes: generating the screen display information for prompting the vehicle in the same running direction as the autonomous vehicle to obey the traffic rule, and transmitting the screen display information to at least one of the rear display screen or the lateral display screen of the autonomous vehicle for display.

In these application scenarios, in the rear and lateral directions of the autonomous vehicle, there are vehicles in the same running direction as the autonomous vehicle. The executing body may display the screen display information via the at least one of the rear display screen or the lateral display screen of the autonomous vehicle, to prompt the vehicle in the same running direction as the autonomous vehicle to obey the traffic rule.

In these application scenarios, information may be intuitively displayed to the vehicle in the same running direction as the autonomous vehicle via the display screen, such that the vehicle in the same running direction as the autonomous vehicle obeys the traffic rule, to ensure smooth passage of the autonomous vehicle.

In some alternative situations of these application scenarios, the at least one of the rear display screen or the lateral display screen includes: a screen in a direction of detecting the vehicle in the same running direction as the autonomous vehicle in the rear screen and the lateral screen.

In these alternative situations, the executing body may display the screen display information on the display screen of the vehicle in the same running direction as the autonomous vehicle. Specifically, the executing body may determine a direction of the vehicle in the same running direction as the autonomous vehicle by various approaches. For example, the executing body may use a direction in which a vehicle is detected among the lateral and rear directions of the autonomous vehicle as the direction of the vehicle in the same running direction as the autonomous vehicle. In addition, the executing body may further determine a target vehicle having an angle between a vehicle head direction of the target vehicle and a vehicle head direction of the autonomous vehicle smaller than a preset angle threshold from vehicles detected in the lateral and rear directions of the autonomous vehicle, and determine the direction of the target vehicle as the direction of the vehicle in the same running direction as the autonomous vehicle.

In these situations, the screen display information may be displayed in the direction of the vehicle in the same running direction as the autonomous vehicle, to avoid invalid display of the screen display information of the autonomous vehicle.

Figure 5:
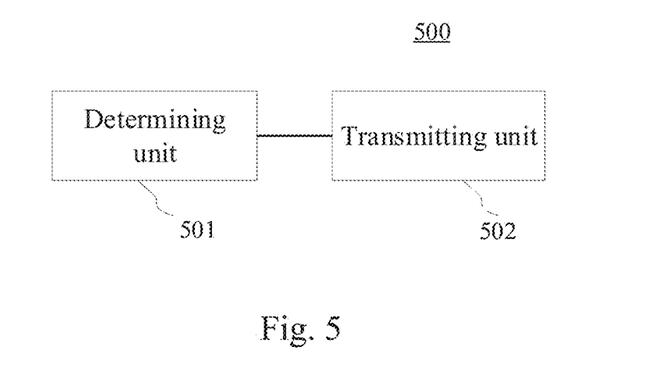
FIG. 5 is a schematic structural diagram of an apparatus for vehicle interaction according to an embodiment of the present disclosure.

Further referring to FIG. 5, as an implementation of the method shown in the above figures, an embodiment of the present disclosure provides an apparatus for vehicle interaction. The embodiment of the apparatus corresponds to the embodiment of the method shown in FIG. 2. The apparatus may be specifically applied to various electronic devices.

As shown in FIG. 5, the apparatus 500 for vehicle interaction according to the present embodiment includes: a determining unit 501, and a transmitting unit 502. The determining unit 501 is configured to determine, in response to determining that a running route of the autonomous vehicle at a currently arriving intersection overlaps with a running route of an opposing vehicle at the currently arriving intersection, a party having a right of way at the currently arriving intersection from the autonomous vehicle and the opposing vehicle based on the running route of the autonomous vehicle and the running route of the opposing vehicle; and the transmitting unit 502 is configured to generate and transmit a prompt message based on a determining result of the right of way, the prompt message being used for prompting the party having the right of way to go first and a party having no right of way to give way.

In some embodiments, the determining unit 501 of the apparatus 500 for vehicle interaction may determine, in response to determining that a running route of the autonomous vehicle at a currently arriving intersection overlaps with a running route of an opposing vehicle, a party having a right of way at the currently arriving intersection from the autonomous vehicle and the opposing vehicle a based on the running route of the autonomous vehicle and the running route of the opposing vehicle. Specifically, when going through the intersection, a vehicle opposite to the intersection is the opposing vehicle. The right of way, i.e., a priority of starting, refers to a right of a road user to preferentially go, as determined based on a traffic rule.

In some embodiments, the transmitting unit 502 may be configured to generate the prompt message based on the determining result of the right of way, and transmit the prompt message. Here, the executing body may transmit the prompt message to other components of the autonomous vehicle or an apparatus connected to the autonomous vehicle, for example, to store, display, or play the prompt message. In addition, the executing body may further transmit the prompt message to other vehicles, such as the opposing vehicle.

In some alternative implementations of the present embodiment, the prompt message includes a first prompt message for prompting the opposing vehicle to go first, and a second prompt message for prompting the opposing vehicle to give way; and the transmitting unit is further configured to execute the generating and transmitting the prompt message based on the determining result of the right of way as follows: generating and transmitting, in response to determining that the opposing vehicle has the right of way, the first prompt message for prompting the opposing vehicle to go first; and generating and transmitting, in response to determining that the autonomous vehicle has the right of way, the second prompt message for prompting the opposing vehicle to give way.

In some alternative implementations of the present embodiment, a vehicle head of the autonomous vehicle is provided with a display screen, and the second prompt message includes screen display information for prompting the opposing vehicle to give way; and the transmitting unit is further configured to execute the generating and transmitting the second prompt message for prompting the opposing vehicle to give way as follows: generating the screen display information for prompting the opposing vehicle to give way, and transmitting the screen display information to the display screen for display.

In some alternative implementations of the present embodiment, the transmitting unit is further configured to execute the generating the screen display information for prompting the opposing vehicle to give way as follows: generating, in response to determining that a number of opposing vehicles is less than or equal to a preset threshold, the screen display information for prompting the opposing vehicle to give way.

In some alternative implementations of the present embodiment, the autonomous vehicle is provided with a spot lamp, and the second prompt message includes spot lamp projection information for prompting the opposing vehicle to give way; and the transmitting unit is further configured to execute the generating and transmitting the second prompt message for prompting the opposing vehicle to give way as follows: determining, in response to determining that the number of opposing vehicles is greater than the preset threshold, a current interactive vehicle of the autonomous vehicle from the opposing vehicles; and generating the spot lamp projection information for prompting the opposing vehicle to give way, and transmitting the spot lamp projection information to the spot lamp of the autonomous vehicle for projection in front of the interactive vehicle.

In some alternative implementations of the present embodiment, the vehicle head of the autonomous vehicle is provided with a display screen, and the first prompt message includes screen display information for prompting the opposing vehicle to go first; and the transmitting unit is further configured to execute the generating and transmitting the first prompt message for prompting the opposing vehicle to give way as follows: generating the screen display information for prompting the opposing vehicle to go first, and transmitting the screen display information to the display screen of the autonomous vehicle for display.

In some alternative implementations of the present embodiment, the transmitting unit is further configured to execute the generating the screen display information for prompting the opposing vehicle to go first as follows: generating, in response to determining that the number of opposing vehicles is less than or equal to the preset threshold, the screen display information for prompting the opposing vehicle to go first.

In some alternative implementations of the present embodiment, the autonomous vehicle is provided with a spot lamp, and the first prompt message includes spot lamp projection information for prompting the opposing vehicle to go first; and the transmitting unit is further configured to execute the generating and transmitting the first prompt message for prompting the opposing vehicle to give way as follows: determining, in response to determining that the number of opposing vehicles is greater than the preset threshold, a current interactive vehicle of the autonomous vehicle from the opposing vehicles; and generating the spot lamp projection information for prompting the opposing vehicle to go first, and transmitting the spot lamp projection information to the spot lamp of the autonomous vehicle for projection in front of the interactive vehicle.

In some alternative implementations of the present embodiment, the transmitting unit is further configured to execute the generating and transmitting, in response to determining that the autonomous vehicle has the right of way, the second prompt message for prompting the opposing vehicle to give way as follows: generating and transmitting the second prompt message, in response to determining that the autonomous vehicle has the right of way and the opposing vehicle is in a state of waiting for going.

In some alternative implementations of the present embodiment, the apparatus further includes: a warning unit configured to transmit, in response to determining that the opposing vehicle fails to give way, a third prompt message for warning the opposing vehicle to stop.

In some alternative implementations of the present embodiment, the apparatus further includes: a stopping unit configured to issue, in response to determining that a distance between the autonomous vehicle and the opposing vehicle meets a preset collision warning condition, an instruction for stopping running of the autonomous vehicle; and an uploading unit configured to acquire vehicle information of the opposing vehicle, generate a corresponding running behavior record based on the vehicle information, and transmit the running behavior record to a vehicle management platform server.

In some alternative implementations of the present embodiment, the apparatus further includes: a same running direction prompting unit configured to generate and transmit a fourth prompt message, where the fourth prompt message is used for prompting a vehicle in a same running direction as the autonomous vehicle to obey a traffic rule.

In some alternative implementations of the present embodiment, the autonomous vehicle is provided with a rear display screen and a lateral display screen, and the fourth prompt message includes screen display information for prompting the vehicle in the same running direction as the autonomous vehicle to obey the traffic rule; and the same running direction prompting unit is further configured to execute the generating and transmitting the fourth prompt message as follows, including: generating the screen display information for prompting the vehicle in the same running direction as the autonomous vehicle to obey the traffic rule, and transmitting the screen display information to at least one of the rear display screen or the lateral display screen of the autonomous vehicle for display.

In some alternative implementations of the present embodiment, the at least one of the rear display screen or the lateral display screen includes: a screen in a direction of detecting the vehicle in the same running direction as the autonomous vehicle in the rear screen and the lateral screen.

Figure 6:
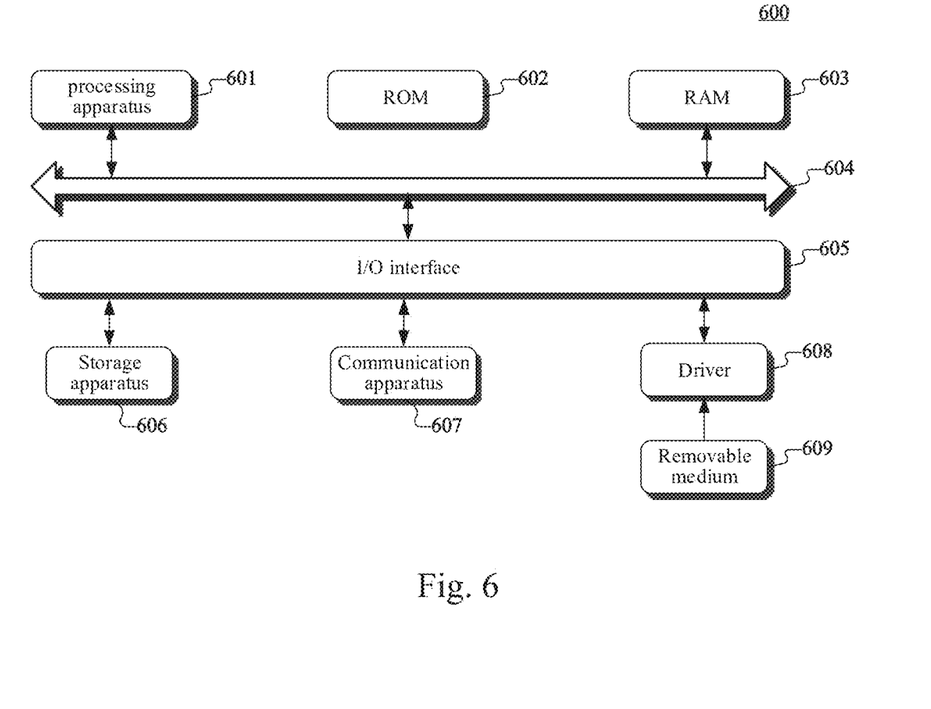
FIG. 6 is a schematic structural diagram of a computer system adapted to implement an electronic device of embodiments of the present disclosure.

As shown in FIG. 6, the electronic device 600 may include a processing apparatus (e.g., a central processing unit (CPU), or a graphics processor) 601, which may execute various appropriate actions and processes in accordance with a program stored in a read only memory (ROM) 602 or a program loaded into a random access memory (RAM) 603 from a storage apparatus 608. The RAM 603 further stores various programs and data required by operations of the electronic device 600. The processing unit 601, the ROM 602 and the RAM 603 are connected to each other through a bus 604. An input/output (I/O) interface 605 is also connected to the bus 604.

In general, the following units may be connected to the I/O interface 605: an input apparatus 606 including a touch screen, a touch pad, a keyboard, a mouse, a camera, a microphone, an accelerometer, a gyroscope, or the like; an output apparatus 607 including a liquid crystal display device (LCD), a speaker, a vibrator, or the like; a storage apparatus 608 including a magnetic tape, a hard disk, or the like; and a communication apparatus 609. The communication apparatus 609 may allow the electronic device 600 to exchange data with other devices through wireless or wired communication. While FIG. 6 shows the electronic device 600 having various units, it should be understood that it is not necessary to implement or provide all of the units shown in the figure. More or fewer units may be alternatively implemented or provided. Each block shown in FIG. 6 may represent an apparatus, or represent a plurality of apparatuses as required.

In particular, according to the embodiments of the present disclosure, the process described above with reference to the flow chart may be implemented in a computer software program. For example, an embodiment of the present disclosure includes a computer program product, which includes a computer program that is tangibly embedded in a computer readable medium. The computer program includes program codes for executing the method as illustrated in the flow chart. In such an embodiment, the computer program may be downloaded and installed from a network via the communication apparatus 609, or be installed from the storage apparatus 608, or be installed from the ROM 602. The computer program, when executed by the processing apparatus 601, implements the functions as defined by the method of the embodiments of the present disclosure. It should be noted that the computer readable medium of the embodiment of the present disclosure may be a computer readable signal medium or a computer readable storage medium, or any combination of the above two. An example of the computer readable storage medium may include, but is not limited to: electric, magnetic, optical, electromagnetic, infrared, or semiconductor systems, apparatuses, elements, or a combination of any of the above. A more specific example of the computer readable storage medium may include, but is not limited to: an electrical connection with one or more pieces of wire, a portable computer disk, a hard disk, a random access memory (RAM), a read only memory (ROM), an erasable programmable read only memory (EPROM or flash memory), an optical fiber, a portable compact disk read only memory (CD-ROM), an optical memory, a magnetic memory, or any suitable combination of the above. In the embodiments of the present disclosure, the computer readable storage medium may be any tangible medium containing or storing programs which may be used by, or used in combination with, a command execution system, apparatus or element. In the embodiments of the present disclosure, the computer readable signal medium may include data signal in the base band or propagating as parts of a carrier wave, in which computer readable program codes are carried. The propagating data signal may take various forms, including but not limited to an electromagnetic signal, an optical signal, or any suitable combination of the above. The computer readable signal medium may also be any computer readable medium except for the computer readable storage medium. The computer readable signal medium is capable of transmitting, propagating or transferring programs for use by, or used in combination with, a command execution system, apparatus or element. The program codes contained on the computer readable medium may be transmitted with any suitable medium, including but not limited to: wire, an optical cable, a RF (radio frequency) medium etc., or any suitable combination of the above.

The flow charts and block diagrams in the accompanying drawings illustrate architectures, functions and operations that may be implemented according to the systems, methods and computer program products of the various embodiments of the present disclosure. In this regard, each of the blocks in the flow charts or block diagrams may represent a module, a program segment, or a code portion, said module, program segment, or code portion including one or more executable instructions for implementing specified logical functions. It should be further noted that, in some alternative implementations, the functions denoted by the blocks may occur in a sequence different from the sequences shown in the figures. For example, any two blocks presented in succession may be executed substantially in parallel, or they may sometimes be executed in a reverse sequence, depending on the functions involved. It should be further noted that each block in the block diagrams and/or flow charts as well as a combination of blocks in the block diagrams and/or flow charts may be implemented using a dedicated hardware-based system executing specified functions or operations, or by a combination of dedicated hardware and computer instructions.

The units involved in the embodiments of the present disclosure may be implemented by software or hardware. The described units may also be provided in a processor, for example, described as: a processor including a determining unit, and a transmitting unit. The names of the units do not constitute a limitation to such units themselves in some cases. For example, the transmitting unit may be further described as "a unit for generating and transmit a prompt message based on a determining result of a right of way."

In another aspect, the present disclosure further provides a computer readable medium. The computer readable medium may be included in the apparatus described in the above embodiments, or a stand-alone computer readable medium without being assembled into the apparatus. The computer readable medium stores one or more programs. The one or more programs, when executed by the apparatus, cause the apparatus to: determine, in response to determining that a running route of the autonomous vehicle at a currently arriving intersection overlaps with a running route of an opposing vehicle at the currently arriving intersection, a party having a right of way at the currently arriving intersection from the autonomous vehicle and the opposing vehicle based on the running route of the autonomous vehicle and the running route of the opposing vehicle; and generate and transmit a prompt message based on a determining result of the right of way, the prompt message being used for prompting the party having the right of way to go first and a party having no right of way to give way.

The above description only provides explanation of the preferred embodiments and the employed technical principles of the present disclosure. It should be appreciated by those skilled in the art that the inventive scope of the present disclosure is not limited to the technical solutions formed by the particular combinations of the above-described technical features. The inventive scope should also cover other technical solutions formed by any combination of the above-described technical features or equivalent features thereof without departing from the inventive concept of the disclosure, for example, technical solutions formed by interchanging the above-described features with, but not limited to, technical features with similar functions disclosed in the present disclosure.

What is claimed is:

1. A method for vehicle interaction for an autonomous vehicle, comprising:
   determining, by a vehicle system of the autonomous vehicle, in response to determining that a running route of the autonomous vehicle at a currently arriving intersection overlaps with a running route of an opposing vehicle at the currently arriving intersection, a party having a right of way at the currently arriving intersection from the autonomous vehicle and the opposing vehicle based on the running route of the autonomous vehicle and the running route of the opposing vehicle; and
   generating and transmitting, by the vehicle system of the autonomous vehicle, a prompt message based on a determining result of the right of way, the prompt message being used for prompting the party having the right of way to go first and a party having no right of way to give way;
   wherein the prompt message comprises a first prompt message for prompting the opposing vehicle to go first, and a second prompt message for prompting the opposing vehicle to give way; and
   the generating and transmitting, by the vehicle system of the autonomous vehicle, the prompt message based on the determining result of the right of way comprises:
   generating and transmitting, by the vehicle system of the autonomous vehicle, in response to determining that the autonomous vehicle has the right of way, the second prompt message for prompting the opposing vehicle to give way;
   wherein the autonomous vehicle is provided with a spot lamp, and the second prompt message comprises spot lamp projection information for prompting the opposing vehicle to give way; and
   the generating and transmitting, by the vehicle system of the autonomous vehicle, the second prompt message for prompting the opposing vehicle to give way comprises:
   determining, in response to determining that a number of opposing vehicles is greater than a preset threshold, a current interactive vehicle of the autonomous vehicle from the opposing vehicles; and
   generating the spot lamp projection information for prompting the opposing vehicle to give way, and transmitting the spot lamp projection information to the spot lamp of the autonomous vehicle for projection in front of the interactive vehicle.

2. The method according to claim 1, wherein
   the generating and transmitting, by the vehicle system of the autonomous vehicle, the prompt message based on the determining result of the right of way further comprises:
   generating and transmitting, by the vehicle system of the autonomous vehicle, in response to determining that the opposing vehicle has the right of way, the first prompt message for prompting the opposing vehicle to go first.

3. The method according to claim 1, wherein the vehicle head of the autonomous vehicle is provided with a display screen, and the second prompt message further comprises screen display information for prompting the opposing vehicle to give way; and
   the generating and transmitting, by the vehicle system of the autonomous vehicle, the second prompt message for prompting the opposing vehicle to give way further comprises:
   generating the screen display information for prompting the opposing vehicle to give way, and transmitting the screen display information to the display screen for display.

4. The method according to claim 3, wherein the generating the screen display information for prompting the opposing vehicle to give way comprises:
   generating, in response to determining that a number of opposing vehicles is less than or equal to a preset threshold, the screen display information for prompting the opposing vehicle to give way.

5. The method according to claim 2, wherein the vehicle head of the autonomous vehicle is provided with a display screen, and the first prompt message comprises screen display information for prompting the opposing vehicle to go first; and
   the generating and transmitting, by the vehicle system of the autonomous vehicle, the first prompt message for prompting the opposing vehicle to go first comprises:
   generating the screen display information for prompting the opposing vehicle to go first, and transmitting the screen display information to the display screen of the autonomous vehicle for display.

6. The method according to claim 5, wherein the generating the screen display information for prompting the opposing vehicle to go first comprises:
generating, in response to determining that a number of opposing vehicles is less than or equal to a preset threshold, the screen display information for prompting the opposing vehicle to go first.

7. The method according to claim 2, wherein the autonomous vehicle is provided with the spot lamp, and the first prompt message comprises spot lamp projection information for prompting the opposing vehicle to go first; and
the generating and transmitting, by the vehicle system of the autonomous vehicle, the first prompt message for prompting the opposing vehicle to go first comprises:
determining, in response to determining that a number of opposing vehicles is greater than a preset threshold, a current interactive vehicle of the autonomous vehicle from the opposing vehicles; and
generating the spot lamp projection information for prompting the opposing vehicle to go first, and transmitting the spot lamp projection information for prompting the opposing vehicle to go first to the spot lamp of the autonomous vehicle for projection in front of the interactive vehicle.

8. The method according to claim 1, wherein the generating and transmitting, by the vehicle system of the autonomous vehicle, in response to determining that the autonomous vehicle has the right of way, the second prompt message for prompting the opposing vehicle to give way comprises:
generating and transmitting the second prompt message, in response to determining that the autonomous vehicle has the right of way and the opposing vehicle is in a state of waiting for going.

9. The method according to claim 8, wherein after generating and transmitting, by the vehicle system of the autonomous vehicle, the second prompt message, the method further comprises:
transmitting, in response to determining that the opposing vehicle fails to give way, a third prompt message for warning the opposing vehicle to stop.

10. The method according to claim 9, wherein after transmitting the third prompt message for warning the opposing vehicle to stop, the method further comprises:
issuing, in response to determining that a distance between the autonomous vehicle and the opposing vehicle meets a preset collision warning condition, an instruction for stopping running of the autonomous vehicle; and
acquiring vehicle information of the opposing vehicle, generating a corresponding running behavior record based on the vehicle information, and transmitting the running behavior record to a vehicle management platform server.

11. The method according to claim 1, wherein the method further comprises:
generating and transmitting a fourth prompt message, wherein the fourth prompt message is used for prompting a vehicle in a same running direction as the autonomous vehicle to obey a traffic rule.

12. The method according to claim 11, wherein the autonomous vehicle is provided with a rear display screen and a lateral display screen, and the fourth prompt message comprises screen display information for prompting the vehicle in the same running direction as the autonomous vehicle to obey the traffic rule; and
the generating and transmitting the fourth prompt message comprises:
generating the screen display information for prompting the vehicle in the same running direction as the autonomous vehicle to obey the traffic rule, and transmitting the screen display information to at least one of the rear display screen or the lateral display screen of the autonomous vehicle for display.

13. The method according to claim 12, wherein the at least one of the rear display screen or the lateral display screen comprises:
a screen in a direction of detecting the vehicle in the same running direction as the autonomous vehicle in the rear screen and the lateral screen.

14. A non-transitory computer readable storage medium, storing a computer program thereon, wherein the program, when executed by a processor, causes the processor to implement the method according to claim 1.

15. An apparatus for vehicle interaction for an autonomous vehicle, comprising:
at least one processor; and
a memory storing instructions, wherein the instructions when executed by the at least one processor, cause the at least one processor to perform operations, the operations comprising:
determining by a vehicle system of the autonomous vehicle, in response to determining that a running route of the autonomous vehicle at a currently arriving intersection overlaps with a running route of an opposing vehicle at the currently arriving intersection, a party having a right of way at the currently arriving intersection from the autonomous vehicle and the opposing vehicle based on the running route of the autonomous vehicle and the running route of the opposing vehicle; and
generating and transmitting, by the vehicle system of the autonomous vehicle, a prompt message based on a determining result of the right of way, the prompt message being used for prompting the party having the right of way to go first and a party having no right of way to give way;
wherein the prompt message comprises a first prompt message for prompting the opposing vehicle to go first, and a second prompt message for prompting the opposing vehicle to give way; and
the generating and transmitting, by the vehicle system of the autonomous vehicle, the prompt message based on the determining result of the right of way comprises:
generating and transmitting, by the vehicle system of the autonomous vehicle, in response to determining that the autonomous vehicle has the right of way, the second prompt message for prompting the opposing vehicle to give way;
wherein the autonomous vehicle is provided with a spot lamp, and the second prompt message comprises spot lamp projection information for prompting the opposing vehicle to give way; and
the generating and transmitting, by the vehicle system of the autonomous vehicle, the second prompt message for prompting the opposing vehicle to give way comprises:
determining, in response to determining that a number of opposing vehicles is greater than a preset threshold, a current interactive vehicle of the autonomous vehicle from the opposing vehicles; and generating the spot lamp projection information for prompting the opposing vehicle to give way, and transmitting the spot lamp projection information to the spot lamp of the autonomous vehicle for projection in front of the interactive vehicle.

\* \* \* \* \*